(12) United States Patent
Krause et al.

(10) Patent No.: US 11,046,559 B2
(45) Date of Patent: Jun. 29, 2021

(54) LIFTING DEVICE AND METHOD FOR OPERATING A LIFTING DEVICE

(71) Applicant: Konecranes Global Corporation, Hyvinkää (FI)

(72) Inventors: Gabriel Krause, Nordkirchen (DE); Daniel Kleinwächter, Unna (DE); Ralf Pamotat, Herdecke (DE); Torsten Reetz, Hagen (DE)

(73) Assignee: Konecranes Global Corporation, Hyvinkää (FI)

( * ) Notice: Subject to any disclaimer, the term of this patent is extended or adjusted under 35 U.S.C. 154(b) by 43 days.

(21) Appl. No.: 16/302,705

(22) PCT Filed: May 16, 2017

(86) PCT No.: PCT/EP2017/061737
§ 371 (c)(1),
(2) Date: Nov. 19, 2018

(87) PCT Pub. No.: WO2017/198669
PCT Pub. Date: Nov. 23, 2017

(65) Prior Publication Data
US 2019/0119079 A1  Apr. 25, 2019

(30) Foreign Application Priority Data
May 20, 2016 (DE) .......................... 102016109295.9

(51) Int. Cl.
*H02P 3/22* (2006.01)
*B66C 13/28* (2006.01)
(Continued)

(52) U.S. Cl.
CPC ................ *B66C 13/28* (2013.01); *B66D 1/12* (2013.01); *B66D 1/485* (2013.01); *B66D 5/30* (2013.01);
(Continued)

(58) Field of Classification Search
CPC .............. B66C 13/28; B66D 1/12; H02P 3/22
(Continued)

(56) References Cited

U.S. PATENT DOCUMENTS

| | | | | |
|---|---|---|---|---|
| 4,521,724 A * | 6/1985 | Sakamoto | ............... | H02P 23/06 318/757 |
| 6,369,538 B1 * | 4/2002 | Youn | ...................... | D06F 37/40 318/362 |
| 2015/0375959 A1 * | 12/2015 | Agirman | ................. | B66B 1/302 187/247 |

FOREIGN PATENT DOCUMENTS

| CN | 86103640 A | 12/1987 |
|---|---|---|
| CN | 2116993 U | 9/1992 |

(Continued)

OTHER PUBLICATIONS

Machine translation JP 63110987 A (Year: 1988).*
(Continued)

*Primary Examiner* — Kawing Chan
(74) *Attorney, Agent, or Firm* — Gardner, Linn, Burkhart & Ondersma LLP

(57) ABSTRACT

A lifting device includes a motor designed as a three-phase asynchronous motor via which the lifting device can be driven to lift and lower a load, and includes a brake resistor via which a power output resulting from a motor generator operation that is carried out when lowering the load at a lowering speed can be converted into heat. The brake resistor is designed for a rated power which is less than the power resulting with a nominal load and a nominal speed. A method for operating a lifting device includes lowering a load at a lowering speed while taking into consideration at least one load capacity characteristic value of the brake resistor for the lowering speed, a threshold is set such that while lowering the load at the lowering speed corresponding (Continued)

to the threshold, the resulting power output is limited to the at least one load capacity characteristic value.

13 Claims, 2 Drawing Sheets

(51) Int. Cl.
*B66D 1/12* (2006.01)
*B66D 1/48* (2006.01)
*B66D 5/30* (2006.01)

(52) U.S. Cl.
CPC .......... *H02P 3/22* (2013.01); *B66C 2700/081* (2013.01); *B66C 2700/084* (2013.01)

(58) Field of Classification Search
USPC ........................................................ 318/759
See application file for complete search history.

(56) References Cited

FOREIGN PATENT DOCUMENTS

| CN | 101065309 | A | | 10/2007 |
|---|---|---|---|---|
| CN | 103717808 | A | | 4/2014 |
| DE | 1815421 | A1 | | 7/1970 |
| DE | 3739339 | A1 | | 7/1988 |
| DE | 4200984 | A1 | | 7/1993 |
| DE | 19645811 | A1 | | 6/1998 |
| DE | 102006043492 | A1 | | 3/2008 |
| DE | 60131231 | T2 | | 5/2008 |
| DE | 102010020123 | B4 | | 9/2012 |
| JP | 61254086 | A | * | 11/1986 |
| JP | 63110987 | A | * | 5/1988 |
| WO | 2012084508 | A2 | | 6/2012 |
| WO | 2015082766 | A1 | | 6/2015 |

OTHER PUBLICATIONS

Machine translation JP 61254086 A (Year: 1986).*
International Search Report of the International Searching Authority from corresponding Patent Cooperation Treaty (PCT) Application No. PCT/EP2017/061737, indicated completed on Aug. 31, 2017.
Written Opinion of the International Searching Authority from corresponding Patent Cooperation Treaty (PCT) Application No. PCT/EP2017/061737, indicated completed on Aug. 31, 2017.
Preliminary Report on Patentability of the International Searching Authority in English from corresponding Patent Cooperation Treaty (PCT) Application No. PCT/EP2017/061737, completed Nov. 20, 2018.

* cited by examiner

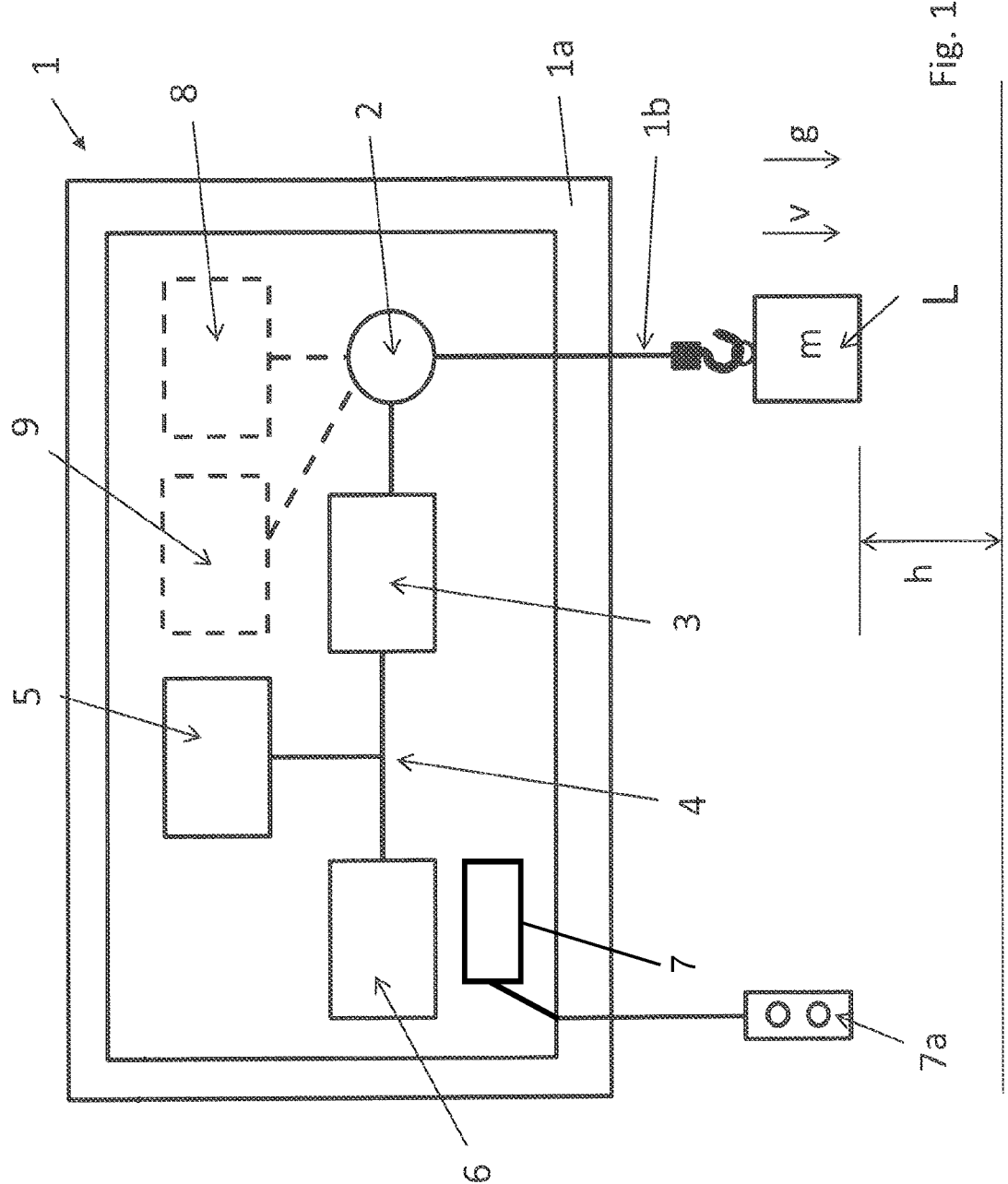

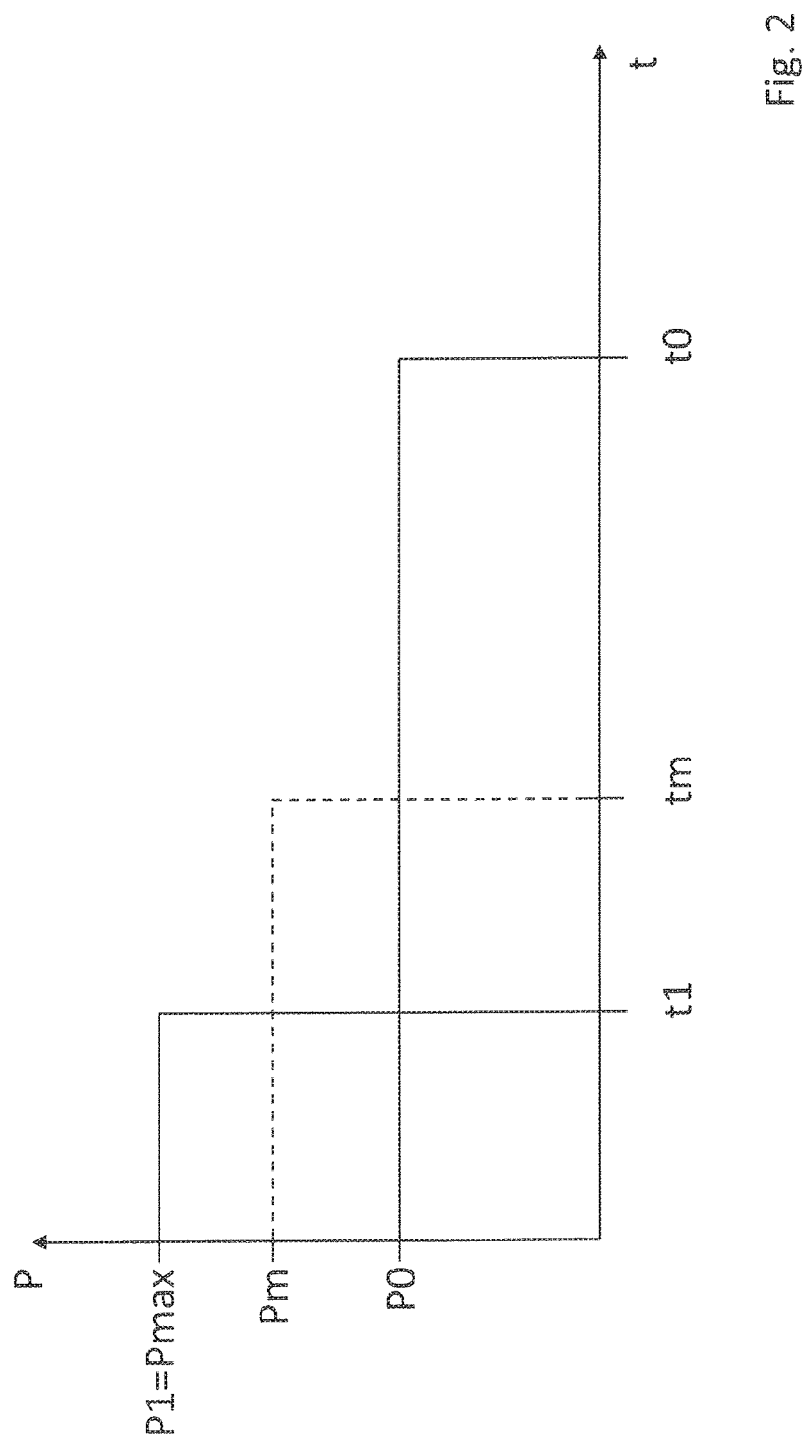

LIFTING DEVICE AND METHOD FOR OPERATING A LIFTING DEVICE

CROSS REFERENCE TO RELATED APPLICATION

The present application claims the priority benefits of International Patent Application No. PCT/EP2017/061737, filed on May 16, 2017, and claims benefit of German application DE 20 2016 109 295.5, filed on May 20, 2016.

BACKGROUND OF THE INVENTION

The invention relates to a lifting mechanism for lifting and lowering a load, comprising a motor which is designed as a three-phase asynchronous motor and by means of which the lifting mechanism can be driven in order to lift and lower the load, and comprising a brake resistor, by means of which power resulting from regenerative operation of the motor taking place during lowering of the load at a lowering speed can be converted into heat.

The invention also relates to a method for operating a corresponding lifting mechanism.

DE 10 2006 043 492 A1 discloses a lifting device, the lifting mechanism of which can be adjusted, depending upon the load, to various lifting speeds so that a larger load can be lifted at a reduced lifting speed. A similar lifting mechanism is also described in DE 196 45 811 A1.

DE 37 39 339 A1 discloses a crane installation, the lifting mechanisms of which are driven by means of slip ring rotor motors and comprise a load-dependent lowering speed control.

DE 601 31 231 T2 describes a crane comprising a lifting mechanism, the motor of which can be braked depending upon the load.

Lifting mechanisms comprising drive technologies different to the present invention are also known. For example, DE 18 15 421 A thus describes a lifting mechanism which is operated with a DC motor designed as a compound motor and with a brake resistor in the armature current circuit of the compound motor.

Further uses of brake resistors are known from DE 10 2010 020 123 B4 and DE 42 00 984 A1.

SUMMARY OF THE INVENTION

The present invention provides an improved lifting mechanism and an improved method for operating a lifting mechanism.

In order to improve a lifting mechanism for lifting and lowering a load, comprising a motor which is designed as a three-phase asynchronous motor and by means of which the lifting mechanism can be driven in order to lift and lower the load, and comprising a brake resistor, by means of which power resulting from regenerative operation of the motor taking place during lowering of the load at a lowering speed can be converted into heat, it is proposed that the brake resistor is designed for a nominal power which is less than the power resulting with a nominal load and nominal lowering speed. In contrast to a brake resistor which is designed for operating the lifting mechanism with a nominal load and nominal lowering speed and is thus correspondingly larger in comparison, the inventively smaller dimensioning of the brake resistor advantageously requires a reduced amount of space. The production costs and the weight of the brake resistor and of the lifting mechanism can also be reduced in this manner.

In a structurally simple manner, provision is made that the motor can be activated via a controller and in the controller, taking into consideration at least one load capacity characteristic value of the brake resistor for the lowering speed, a threshold value can be set such that during lowering of the load at the lowering speed, which corresponds to the threshold value, the resulting power is limited to the at least one load capacity characteristic value. Therefore, the lowering speed can be easily set electronically or digitally in the controller to the dimensioning of the brake resistor. This permits, on the whole, particularly economical operation of the lifting mechanism in accordance with the invention, in particular if load situations with a nominal load rarely occur and in this case a lowering speed which is reduced in comparison with the nominal lowering speed can be accepted in order to avoid overloading of the brake resistor. In contrast, in a large number of the load situations which occur, the correspondingly smaller dimensioning of the brake resistor is itself adequate for lowering at a nominal lowering speed or the lowering speed must be limited only slightly by setting the threshold value in order not to exceed the load capacity characteristic values of the brake resistor.

In an advantageous manner, provision is also made that the threshold value can be set taking into consideration the load mass of the load picked up by the lifting mechanism and/or the lifting path of the load picked up by the lifting mechanism or the resulting power.

By additionally taking the load mass into consideration, it is possible to configure the at least one load capacity characteristic value of the brake resistor for a working region with load situations or load masses which occur frequently in a manner specific to the application. This can be effected in such a way that e.g. all loads, of which the load mass corresponds to 50% of the nominal load or less can be lowered at a nominal speed without in this case overloading the brake resistor by exceeding its at least one load capacity characteristic value. For all loads including more than 50% of the nominal load, the threshold value for the lowering speed must be reduced. The threshold value can be continuously reduced from the outset or proceeding from the nominal speed to a value dependent upon the current load mass, as described hereinafter e.g. in relation to the second embodiment.

By additionally taking the lifting path into consideration, it is also possible to configure the at least one load capacity characteristic value of the brake resistor for a working region with load situations or lifting paths which occur frequently in a manner specific to the application. In this case, the short switch-on time and the associated peak power of the brake resistor can be dimensioned such that all lowering procedures up to a specified lifting path, e.g. 10% of the nominal lifting path, can be performed at a nominal lowering speed within the short switch-on time at most with the associated peak power and thus without any overloading. This also applies for a nominal load because the value of the peak power is dimensioned accordingly. In the case of a larger determined lifting path and thus a lowering procedure which even at nominal lowering speed lasts longer than the short switch-on time, the threshold value for the lowering speed must be reduced. The threshold value can be continuously reduced from the outset or proceeding from the nominal lowering speed to a value dependent upon the current lifting path, as described hereinafter e.g. in relation to the third embodiment.

If both the load mass and lifting path are taken into consideration, the improvement described in greater detail in relation to the fourth embodiment, namely that the threshold value in some cases can correspond to the nominal lowering speed longer than would be possible if only the load mass or the lifting path is taken into consideration.

If, in order to set the threshold value for the lowering speed, the resulting power is taken into consideration in terms of an actual value, the actual value is compared continuously to the load capacity characteristic value in terms of a desired value in order to prevent the load capacity characteristic value from being exceeded by a correspondingly selected threshold value. If the resulting power is detected by a power sensor in the region of an inverter, intermediate circuit or the brake resistor, a load mass and lifting path do not have to be determined. However, the resulting power can also be determined indirectly via a continuously determined load mass and/or lowering speed by corresponding load or speed sensors which are then part of the power sensor.

In an advantageous manner, provision can likewise be made that the threshold value for the lowering speed can be set and in particular maximised via the controller such that the brake resistor can be operated at most within the scope of the at least one load capacity characteristic value. In this case, the threshold value for the lowering speed, compared with the nominal lowering speed, is not reduced further than is required for operating the brake resistor without any overloading. As a result, the actual lowering speed can be maximised in an economically advantageous manner until the load capacity characteristic value(s) is/are achieved, without in this case causing increased wear by the corresponding load capacity characteristic value being exceeded. This permits a longer service life of the lifting mechanism even with a smaller-dimensioned brake resistor as described in this case.

In a structurally simple manner, provision is made that a load sensor is provided in order to determine a value of the load mass and to provide it to the controller and/or a lifting path sensor is provided in order to determine a value of the lifting path and to provide it to the controller, or a power sensor is provided in order to determine a value of the resulting power and to provide it to the controller. As a result, the threshold value for the lowering speed can be adapted in a particularly simple manner taking into consideration the load being currently picked up, the lifting path or the resulting power. The load sensor can also comprise a motor current measurement in the inverter of the lifting mechanism and a slip measurement by means of a rotary encoder on the motor, said measurements being evaluated in order to determine the load mass in the electronic controller. The power sensor can comprise the load sensor and also a speed sensor for determining the lowering speed.

In order to improve a method for operating a lifting mechanism for lifting and lowering a load, comprising a motor which is designed as a three-phase asynchronous motor and by means of which the lifting mechanism can be driven in order to lift and lower the load, and comprising a brake resistor, by means of which power resulting from regenerative operation of the motor taking place during lowering of the load at a lowering speed can be converted into heat, it is proposed that, during lowering of the load taking into consideration at least one load capacity characteristic value of the brake resistor for the lowering speed, a threshold value is set such that during lowering of the load at the lowering speed, which corresponds to the threshold value, the resulting power is limited to the at least one load capacity characteristic value. By correspondingly setting a threshold value for the lowering speed, which is effected preferably electronically or digitally in the controller of the lifting mechanism, it is advantageously possible to dimension the brake resistor to be smaller than was hitherto conventional and thereby to make savings in terms of space, weight and cost. As a result, the lifting mechanism can be operated even more economically for the reasons stated above in relation to the lifting mechanism in accordance with the invention. By setting a threshold value for the lowering speed differently than in the aforementioned prior art, taking into consideration at least one load capacity characteristic value, for which the installed brake resistor is designed, the lifting mechanism can be operated particularly safely and any overloading of or irreparable damage to the brake resistor are avoided. The method can also be implemented in the controller of the lifting mechanism in a particularly simple manner by means of a suitable software routine.

In a structurally simple manner, provision is also made that the brake resistor is designed for a nominal power which is less than the power resulting with a nominal load and nominal lowering speed. The aforementioned advantages apply in this case accordingly.

In a structurally simple manner, provision is also made that the threshold value is set in a controller of the lifting mechanism, via which the motor can be activated, taking into consideration the load mass of the load picked up by the lifting mechanism and/or the lifting path of the load picked up by the lifting mechanism or the resulting power.

In an advantageous manner, provision is further made that the threshold value for the lowering speed is set and in particular maximised such that the brake resistor can be operated at most within the scope of the at least one load capacity characteristic value. As a result, the actual lowering speed can be maximised in an economically advantageous manner until the load capacity characteristic value(s) is/are achieved, without in this case causing increased wear by virtue of the corresponding load capacity characteristic value being exceeded. This permits low-wear operation with a longer service life of the lifting mechanism even with a smaller-dimensioned brake resistor as described in this case.

In a structurally simple manner, a value of the load mass can also be determined via a load sensor and can be provided to the controller and/or a value of the lifting path can be determined via a lifting path sensor and provided to the controller or a value of the resulting power can be determined via a power sensor and provided to the controller.

An exemplified embodiment of the invention is explained in greater detail with reference to the following description.

BRIEF DESCRIPTION OF THE DRAWINGS

FIG. 1 shows a schematically illustrated cable winch; and
FIG. 2 shows a graph including load capacity characteristic values of a brake resistor.

DESCRIPTION OF THE PREFERRED EMBODIMENTS

FIG. 1 shows a schematically illustrated cable winch 1 for lifting and lowering a load L. The cable winch 1 comprises a lifting mechanism 1a comprising a motor 2 which is designed as an electric motor and in particular as a three-phase asynchronous motor and by means of which a load picking-up means of the lifting mechanism 1a designed as a cable 1b is driven and in this case raised and lowered in order to lift and lower the picked-up load L. In this case, the motor 2 uses a gear mechanism to drive a cable drum (not illustrated), on which the cable 1b is wound in order to lift the load L and from which the cable 1b is unwound in order to lower the load L. The load L picked up by the lifting mechanism 1a is fastened e.g. via a load hook to a suspended end of the cable 1b.

An operator can trigger control commands for lifting and lowering the load L using a control switch 7a, said control commands being executed via a controller 7 of the cable winch 1 operatively connected to the control switch 7a. The lifting mechanism 1a comprises an inverter 3 which is designed preferably as a frequency inverter and via which the motor 2 can be activated by means of the controller 7 or the control switch 7a. The motor 2 is thus designed accordingly as a so-called inverter-controlled or frequency inverter-controlled electric motor, in particular as a three-phase asynchronous motor. An intermediate circuit 4 designed as a direct voltage intermediate circuit is used for connecting the inverter 3 to an energy source 5, via which electrical energy is fed to the intermediate circuit 4 in order to operate the lifting mechanism 1a and in particular the motor 2.

If the load L is lowered as a result of a corresponding control command, the motor 2 operates as a generator and, in the so-called regenerative operation, feeds electrical energy back to capacitors (not illustrated) of the intermediate circuit 4. During regenerative operation of the motor 2, the voltage in the intermediate circuit 4 consequently increases. In order to prevent safety devices from being triggered or to prevent the failure of electronic components of the lifting mechanism 1a, it is necessary to prevent the voltage in the intermediate circuit 4 from increasing excessively. For this purpose, a brake resistor 6 is connected to the intermediate circuit 4. The brake resistor 6 is operated accordingly as an intermediate circuit resistor. When a specific voltage value in the intermediate circuit 4 is exceeded, a brake chopper which monitors the voltage in the intermediate circuit 4 is activated, as a result of which excessive energy in the form of current is conducted to the brake resistor 6. Then, the excessive energy or electrical power is converted by the brake resistor 6 into heat or heat output and is thus withdrawn from the intermediate circuit 4. Corresponding brake choppers can be part of the inverter 3.

When designing or dimensioning the brake resistor 6, it is necessary to take into consideration the electrical power P which is to be applied or absorbed by the brake resistor 6 and which results from the regenerative operation of the motor 2 as the load L is being lowered. The resulting power P is produced from the interrelationships and physical properties of the lifting mechanism 1a set forth hereinafter.

In this case, the following applies to the resulting power $P=E/t_s$, where E is the energy to be converted to a maximum extent proceeding from the stationary state of a load L, which has been previously raised on a lifting path h, during lowering of the load L on the lifting path h, and where $t_s$ is the lowering time required for this purpose. In this case, E corresponds to the product of the load mass m of the load L, the gravitational acceleration g, the lifting path h of the load L and the efficiency $\eta$ of the lifting mechanism 1a and therefore the following applies: $E=m*g*h*\eta$. The lowering time $t_s$ is derived, in turn, from the quotient h/v, where h is the lifting path of the load L and v is the lowering speed of the load L, at which the load L travels the lifting path h during lowering. Therefore, for the purpose of configuring the brake resistor 6, a zero-acceleration and thus constant lowering speed v of the load L on the lifting path h will be assumed for simplification.

Therefore, the following applies in general for the power P to be applied by the brake resistor 6: $P=m*g*v*\eta$. Since g and $\eta$ can be considered to be constants, the power P is thus dependent only upon the load mass m and upon the lowering speed v.

The maximum possible resulting power Pmax is thus produced in the lifting mechanism 1a if lowering is performed with a nominal load at nominal lowering speed. In this case, the term nominal load is understood to be a load L having a maximum permissible load mass m or corresponding load weight corresponding to the load bearing capacity of the lifting mechanism 1a and the term nominal lowering speed is understood to be the maximum lowering speed v for a load L permitted for the lifting mechanism 1a.

FIG. 2 illustrates a graph including load capacity characteristic values, i.e. switch-on time-dependent power values, of the brake resistor 6. In the case of the lifting mechanism 1a in accordance with the invention, the brake resistor 6 is configured for a nominal power P0 which is less than the power Pmax which results according to the above formula with a nominal load and nominal lowering speed. The nominal power P0 can be applied or absorbed, without any overloading, by the brake resistor 6 during a time interval which is designated hereinafter as the reference switch-on time t0. The brake resistor 6 can also apply or absorb, without any overloading, a peak power P1, which is greater than the nominal power P0 and corresponds to at least Pmax, but only for a time interval which is shorter than the reference switch-on time t0 and is defined hereinafter as the short switch-on time t1. If the peak power P1 is also applied to the brake resistor 6 beyond the associated short switch-on time t1, there will be an unavoidable overloading of the brake resistor 6. As illustrated by the broken line in FIG. 2, the brake resistor 6 can also be operated, without any overloading, with at least one peak power Pm, which is greater than the nominal power P0 but less than the peak power P1, for a short switch-on time tm longer than t1 but shorter than t0. In this case, it is generally the case that a shorter switch-on time permits a greater peak power without any overloading than a longer switch-on time. The nominal power P0 and its reference switch-on time t0, which is associated as a reference variable, together also constitute a load capacity characteristic value of the brake resistor 6, like the peak power P1 or Pm and its short switch-on time t1 or tm associated as a reference variable.

In association with the previously described design of the brake resistor 6, a suitable method for operating the lifting mechanism 1a must be employed to ensure that the power P resulting during the regenerative operation of the motor 2 is limited to the load capacity characteristic value(s) P0/t0 and/or P1/t1 and/or Pm/tm in order not to exceed any of these load capacity characteristic values and to avoid overloading of the brake resistor 6. Otherwise, corresponding overloading gives rise to the risk of the brake resistor 6 and further components of the lifting mechanism 1a being overheated and irreparably damaged. The embodiments described hereinafter are possible for the lifting mechanism 1a and the method for operating the same.

According to a first embodiment, a threshold value vmax for the lowering speed v is set in terms of a maximum possible desired value by and in the controller 7 in dependence upon or taking into consideration at least one load capacity characteristic value of the brake resistor 6. The setting of the threshold value vmax ensures that during the execution of a corresponding control command to lower the load L, the preferably continuously adjustable actual lowering speed v in terms of an actual value is limited to the threshold value vmax via the controller 7 and the inverter 3. It is also assumed that the mass m of the load L corresponds at most to the nominal load because with a greater mass m the lifting mechanism 1a is shut down by an overload safety device, not illustrated.

According to a first alternative of the first embodiment, at least the nominal power P0 with the associated reference switch-on time t0 is stored as the load capacity characteristic value of the installed brake resistor 6 in the controller 7 and this value is thus available as a specified operand for setting the threshold value vmax. Hence, taking into consideration the stored load capacity characteristic value P0/t0, the threshold value vmax is set below the nominal lowering speed to such an extent that in order to prevent the brake resistor 6 from becoming overloaded said brake resistor is then operated at most at its nominal power P0, if lowering is performed with the nominal load on the nominal lifting path, i.e. the maximum possible lifting path h. According to the first alternative of the first embodiment, the threshold value vmax which is set for the lowering speed v is constantly below the nominal lowering speed. This applies to all lowering procedures irrespective of the actual value of the load mass m and the lifting path h.

In a second alternative of the first embodiment, in addition at least one peak power P1 with the associated short switch-on time t1 is stored as a further load capacity characteristic value in the controller 7 and this value is provided as a specified operand for setting the threshold value vmax. In the example illustrated in FIG. 2, P1 corresponds to Pmax but can also be greater in dimension. Therefore, the threshold value vmax can be set taking into consideration the stored load capacity characteristic values P0/t0 and P1/t1 such that lowering can be performed initially at nominal lowering speed without overloading the brake resistor 6. The threshold value vmax thus corresponds initially to the nominal lowering speed. Operation of the brake resistor 6 above P0, in particular at P1=Pmax is possible in this case but for no longer than the short switch-on time t1. In order to avoid any overloading of the brake resistor 6, the threshold value vmax for the lowering speed v is reduced via the controller 7 even before the short switch-on time t1 elapses, such that as the short switch-on time t1 elapses the brake resistor 6 is itself then operated at most at its nominal power P0, if lowering continues to be performed with a nominal load, e.g. on the nominal lifting path. The lowering speed v and the resulting power P are reduced in this case preferably in a continuous manner and likewise independently of the current values of the load mass m and the lifting path h. Starting from the nominal lowering speed, the threshold value vmax is reduced accordingly for this purpose so that, when t1 elapses, said threshold value corresponds to the constant threshold value of the first alternative. In this manner, the second alternative permits a lowering procedure which as a whole is performed more rapidly and thus more economically, yet at the same time without any overloading, than is the case with the first alternative. In order to calculate and set the threshold value vmax, it is also possible in the same way to take into consideration one or a plurality of further load capacity characteristic values Pm/tm of the brake resistor 6 with a greater peak power Pm than the nominal power P0 and a shorter short switch-on time tm than the reference switch-on time t0 so that the brake resistor 6 can be operated above P0 at a correspondingly higher lowering speed v correspondingly longer than the short switch-on time t1.

However, in the first embodiment, situations can occur in which the mass m of the load L is so low that, even at nominal lowering speed, at most the nominal power P0 of the brake resistor 6 can be achieved as the resulting power P. The lifting path h can also be so short that a lowering procedure on the lifting path h at nominal lowering speed is completed at the latest when the short switch-on time t1 applying to P1=Pmax elapses. In this case, even with a nominal load there is no risk of overloading because Pmax has to be absorbed by the brake resistor 6 at most for the short switch-on time t1. In these situations, it would not be necessary to reduce the threshold value below the value of the nominal lowering speed because there is no risk of the brake resistor 6 becoming overloaded.

With regard to such situations, the embodiments described hereinafter permit even more economical operation of the lifting mechanism 1a.

According to a second embodiment, provision is made that the controller 7 calculates and sets the threshold value vmax for the lowering speed v, in contrast to the first embodiment, not only in dependence upon or taking into consideration at least one load capacity characteristic value P0/t0, P1/t1, Pm/tm but also in dependence upon or taking into consideration the load mass m of the load L which is picked up and raised by the lifting mechanism 1a. For this purpose, the mass m must be determined and provided to the controller 7. The load mass m is detected preferably in a continuous manner via an optionally provided load sensor 8 which is illustrated accordingly in FIG. 1 in a schematic manner by broken lines and can be connected e.g. to the motor 2 in order to tap the motor current thereof and thereby determine the load mass m and provide the determined value to the controller 7. Furthermore, in a similar manner to the first embodiment, according to a first alternative at least P0/t0 and according to a second alternative also P1/t1, e.g. with P1=Pmax, and/or further Pm/tm, are taken into consideration as the load capacity characteristic value.

Therefore, in the second embodiment the threshold value vmax which is set for the lowering speed v can also correspond to the nominal lowering speed of the lifting mechanism 1a for the entire lowering procedure. This can be the case e.g. when the load hook on its own or together with relatively light loads L is to be lowered on the nominal lifting path and in this case the controller 7 establishes that with the correspondingly determined load mass m the nominal power P0 of the brake resistor 6 cannot be exceeded even at nominal lowering speed. However, starting from a specific load mass m or corresponding load weight, when the load is being lowered at a specific lowering speed v there is a risk of overloading caused by the nominal power P0 of the brake resistor 6 being exceeded. In this case, the value of the specific load mass m can be specified in order to configure the nominal power P0 for a working region such that up to the specific load mass m lowering can always be performed at nominal lowering speed without any overloading. If the load mass m is heavier than the specified value, the risk of overloading of the brake resistor 6 is counteracted by the controller 7, in that the threshold value vmax for the lowering speed v is set or limited to a value which is so much lower than the nominal lowering speed that during lowering in the brake resistor 6 at most its nominal power P0 accumulates and must be converted. As a result, the lifting mechanism 1a can still only be operated at a correspondingly reduced lowering speed v so that the installed brake resistor 6 is specifically not overloaded. The reduction in the threshold value vmax and, associated therewith, the lowering speed v can be performed in this case in a similar manner to the first alternative of the first embodiment such that the lowering speed v is limited from the outset, i.e. even at the beginning of the lowering procedure, to a value corresponding to the nominal power P0. However, in a similar manner to the second alternative of the first embodiment the lowering procedure can also commence at nominal lowering speed and, by correspondingly taking into account t1 and optionally further load capacity characteristic values Pm/tm, can be slowed down by reducing the threshold value vmax in order to limit the resulting power P according to the available load capacity characteristic values Pm/tm.

In a third embodiment of the lifting mechanism 1a alternative to the second embodiment, the controller 7 can calculate and set the threshold value vmax for the lowering speed v, in contrast to the first embodiment, not only in dependence upon or taking into consideration the at least one load capacity characteristic value P0/t0, P1/t1, Pm/tm but also in dependence upon or taking into consideration the lifting path h of the load L which is picked up and raised by the lifting mechanism 1a. For this purpose, the lifting path h must be determined e.g. via an optionally provided lifting path sensor 9, which is illustrated accordingly in FIG. 1 in a schematic manner by broken lines, and a corresponding value must be provided to the controller 7. The lifting path sensor 9 can be designed e.g. as an absolute value transmitter. Furthermore, at least P0/t0 and P1/t1, e.g. with P1=Pmax and/or further Pm/tm are taken into consideration as load capacity characteristic values.

By reference to the determined lifting path h, the controller 7 uses the interrelationship ts=h/v to initially calculate which lowering time ts would result at zero-acceleration and constant nominal lowering speed for a lowering procedure on the determined lifting path h. In knowledge of the stored load capacity characteristic value P1/t1, the controller 7 compares the lowering time ts calculated for the detected lifting path h to the short switch-on time t1. If the calculated lowering time ts has at most a value exactly equal to the short switch-on time t1, the controller 7 does not limit the lowering speed v or sets the threshold value vmax to the value of the nominal lowering speed. Therefore, with sufficiently short lifting paths h lowering can be performed even with a nominal load at a nominal lowering speed and thus without restricting the maximum permissible lowering speed v. This interrelationship can be used when dimensioning the brake resistor 6, in particular in relation to the short switch-on time t1 and associated peak power P1, which must at least be installed in order to be able to perform a lowering procedure, without any overloading, on a desired specified lifting path h even at nominal lowering speed and with a nominal load.

However, if the controller 7 establishes that the lifting path h is too large for the aforementioned conditions and accordingly the calculated lowering time ts would outlast the short switch-on time t1 for the determined lifting path h even at nominal lowering speed, the threshold value vmax and thus the lowering speed v are reduced as described above with reference to the first embodiment. Accordingly, in this case the lowering speed v can also be limited from the outset in a first alternative or at the latest when the short switch-on time t1 elapses in a second alternative such that the rest of the lifting path h remaining after t1 has elapsed can be travelled even with a nominal load without any overloading, i.e. without exceeding one or a plurality of load capacity characteristic values.

A fourth embodiment of the lifting mechanism 1a is likewise possible, according to which, in order to calculate and set the threshold value vmax, both the load mass m and the lifting path h can be taken into consideration and at least P0/t0 and P1/t1, e.g. with P1=Pmax, can also be taken into consideration as load capacity characteristic values. Therefore, e.g. when the nominal load is established the threshold value vmax can remain set to nominal lowering speed for longer compared to the second embodiment, if the controller 7 additionally establishes that the determined lifting path h can be travelled at nominal lowering speed at the latest when t1 elapses. Also, unlike in the third embodiment, the threshold value vmax can remain set to nominal lowering speed, if the controller 7 establishes that the determined lifting path h cannot be completely travelled even at nominal lowering speed during the short switch-on time t1, but the determined load mass m is so low that even at nominal lowering speed there is no risk of overloading because the corresponding load capacity characteristic value P0/t0 is maintained.

According to a fifth embodiment, the controller 7 can also determine and take into consideration the power P, which actually results in terms of an actual value, for the purpose of setting the threshold value vmax such that the threshold value vmax is only reduced when e.g. the nominal power P0 is achieved or when a peak power Pm is provided for a specified time period before the associated short switch-on time tm elapses. The controller 7 thus compares the actual value of the resulting power P to the at least one load capacity characteristic value which serves as the desired value, in order, where necessary, to prevent said characteristic value from being exceeded by virtue of a reduction in the threshold value vmax. The currently resulting power P can be determined continuously via a power sensor (not illustrated) and provided to the controller 7. In this case, the resulting power P can be calculated e.g. from the continuously determined values of the load mass m and/or the lowering speed v, wherein the calculation can be performed in particular also in the controller 7 itself. In this case, the load sensor 8 or a corresponding speed sensor can be part of the power sensor. Alternatively, it is also possible without the aforementioned sensors to detect the resulting power P in the region of the inverter 3, intermediate circuit 4 or brake resistor 6 via a suitable power sensor.

Therefore, in all of the embodiments a reduction in the lowering speed v and, associated therewith, an increase in the lowering time is are at least partially accepted in favour of the above-described smaller dimensioning of the brake resistor 6. This ensures that even with a nominal load a lowering procedure always produces a resulting power P which does not exceed a load capacity characteristic value of the brake resistor 6 but instead is limited thereto. However, with the exception of the first embodiment, in all of the remaining embodiments the threshold value vmax for the lowering speed v is limited with respect to the nominal lowering speed only when the determined load mass m and/or the lifting path h or the resulting power P give rise to the risk of a load capacity characteristic value of the brake resistor 6 being exceeded.

The inventive controller settings or method steps can be implemented in a simple manner digitally or electronically in the form of a suitable software routine in the controller 7.

Instead of providing a lifting device which is designed as a cable winch 1, it is also feasible to provide a lifting device which is designed as a chain pull which has a corresponding lifting mechanism 1a and of which the load picking-up means is not designed as a cable 1b but instead is designed as a chain.

Such lifting mechanisms 1a can also be used as a component of cranes, wherein they can be moved horizontally along a crane girder by means of crane trolleys.

The invention claimed is:
1. A lifting mechanism for lifting and lowering a load, the lifting mechanism comprising:

a motor which is designed as a three-phase asynchronous motor and via which the lifting mechanism can be driven in order to lift and lower the load, and comprising a brake resistor via which power resulting from regenerative operation of the motor taking place during lowering of the load at a lowering speed at or below a speed threshold value can be converted into heat, wherein the brake resistor is designed for a nominal power that is less than the power resulting with a nominal load and nominal lowering speed; and a controller configured to activate the motor and set the threshold value taking into consideration at least one load capacity characteristic value of the brake resistor for the lowering speed such that during lowering of the load at the lowering speed, which corresponds to the threshold value, the resulting power is limited to the at least one load capacity characteristic value, and wherein the threshold value for the lowering speed is maximized via the controller such that the brake resistor can be operated at a maximum power that is within the scope of the at least one load capacity characteristic value.

2. The lifting mechanism as claimed in claim 1, wherein the threshold value can be set taking into consideration the load mass of the load picked up by the lifting mechanism and/or the lifting path of the load picked up by the lifting mechanism or the resulting power.

3. The lifting mechanism as claimed in claim 2, wherein a load sensor is provided in order to determine a value of the load mass and to provide it to the controller and/or a lifting path sensor is provided in order to determine a value of the lifting path and to provide it to the controller, or a power sensor is provided in order to determine a value of the resulting power and to provide it to the controller.

4. The lifting mechanism as claimed in claim 2, wherein a load sensor is provided in order to determine a value of the load mass and to provide it to the controller and/or a lifting path sensor is provided in order to determine a value of the lifting path and to provide it to the controller, or a power sensor is provided in order to determine a value of the resulting power and to provide it to the controller.

5. A method for operating a lifting mechanism for lifting and lowering a load, comprising:

driving the lifting mechanism via a three-phase asynchronous motor in order to lift and lower the load;

converting via a brake resistor power resulting from regenerative operation of the motor taking place during lowering of the load at a lowering speed at or below a speed threshold value into heat;

setting the threshold value during lowering of the load taking into consideration at least one load capacity characteristic value of the brake resistor for the lowering speed such that during lowering of the load at the lowering speed, which corresponds to the threshold value, the resulting power is limited to the at least one load capacity characteristic value and the brake resistor is designed for a nominal power which is less than the power resulting with a nominal load and nominal lowering speed, and wherein the threshold value for the lowering speed is maximized via the controller such that the brake resistor can be operated at a maximum power that is within the scope of the at least one load capacity characteristic value.

6. The method as claimed in claim 5, wherein the threshold value is set in a controller of the lifting mechanism, via which the motor can be activated, taking into consideration the load mass of the load picked up by the lifting mechanism and/or the lifting path of the load picked up by the lifting mechanism or the resulting power.

7. The method as claimed in claim 6, wherein the threshold value for the lowering speed is maximized such that the brake resistor can be operated at a maximum power that is within the scope of the at least one load capacity characteristic value.

8. The method as claimed in claim 7, wherein a value of the load mass is determined via a load sensor and is provided to the controller and/or a value of the lifting path is determined via a lifting path sensor and provided to the controller or a value of the resulting power is determined via a power sensor and provided to the controller.

9. The method as claimed in claim 6, wherein a value of the load mass is determined via a load sensor and is provided to the controller and/or a value of the lifting path is determined via a lifting path sensor and provided to the controller or a value of the resulting power is determined via a power sensor and provided to the controller.

10. The method as claimed in claim 5, wherein the threshold value for the lowering speed is set such that the brake resistor can be operated at a maximum power that is within the scope of the at least one load capacity characteristic value.

11. The method as claimed in claim 10, wherein a value of the load mass is determined via a load sensor and is provided to the controller and/or a value of the lifting path is determined via a lifting path sensor and provided to the controller or a value of the resulting power is determined via a power sensor and provided to the controller.

12. The lifting mechanism as claimed in claim 1, wherein the threshold value for the lowering speed can be set via the controller such that the brake resistor can be operated at a maximum power that is within the scope of the at least one load capacity characteristic value.

13. The lifting mechanism as claimed in claim 12, wherein a load sensor is provided in order to determine a value of the load mass and to provide it to the controller and/or a lifting path sensor is provided in order to determine a value of the lifting path and to provide it to the controller, or a power sensor is provided in order to determine a value of the resulting power and to provide it to the controller.

* * * * *